United States Patent
Cho et al.

(10) Patent No.: US 7,560,687 B2
(45) Date of Patent: Jul. 14, 2009

(54) POLARIZED NEUTRON GUIDE

(75) Inventors: Sang Jin Cho, Daeduck-gu (KR);
Chang Hee Lee, Yuseong-gu (KR);
Hark Rho Kim, Yuseong-gu (KR);
Young Jin Kim, Yuseong-gu (KR)

(73) Assignee: Korea Atomic Energy Research Institute, Daejeon (KR)

( * ) Notice: Subject to any disclaimer, the term of this patent is extended or adjusted under 35 U.S.C. 154(b) by 600 days.

(21) Appl. No.: 11/449,374

(22) Filed: Jun. 8, 2006

(65) Prior Publication Data

US 2007/0076837 A1 Apr. 5, 2007

(30) Foreign Application Priority Data

Jul. 15, 2005 (KR) .................. 10-2005-0064213

(51) Int. Cl.
*H05H 3/02* (2006.01)
*H05H 3/06* (2006.01)
*G12G 1/06* (2006.01)
*G21C 7/00* (2006.01)

(52) U.S. Cl. .............. 250/251; 376/114; 376/158; 376/333

(58) Field of Classification Search ........... 376/114, 376/158, 333; 250/251
See application file for complete search history.

(56) References Cited

U.S. PATENT DOCUMENTS 4,874,574 A * 10/1989 Igarashi et al. ............. 376/333

| 5,082,621 | A | | 1/1992 | Wood |
| 5,949,840 | A | * | 9/1999 | Greene ................... 376/458 |
| 7,439,492 | B1 | * | 10/2008 | Ice ......................... 250/251 |
| 2008/0210880 | A1 | * | 9/2008 | Baroni et al. ............. 250/390.1 |

FOREIGN PATENT DOCUMENTS

| DE | 69102224 T2 | 9/1994 |
| DE | 19844300 A1 | 3/2000 |
| DE | 19936898 C1 | 2/2001 |

OTHER PUBLICATIONS

H. Hase, A. Knopfler, K. Fiederer, U. Schmidt, D. Dubbers and W. Kaiser; A Long Ballistic Supermirror Guide for Cold Neutrons at ILL; Jun. 11, 2002; Science Direct; vol. 485.*

* cited by examiner

*Primary Examiner*—Michael H. Caley
*Assistant Examiner*—Cimberly Nickell
(74) *Attorney, Agent, or Firm*—The Webb Law Firm, P.C.

(57) ABSTRACT

A polarized neutron guide for separating neutrons into polarized neutrons while minimizing loss of the neutrons is provided. The polarized neutron guide includes a body, the first space and the second space, and a neutron separation space. The body includes super mirrors coated with a neutron-reflective thin film and the first and second spaces are formed by the first plate inside the body. The neutron separation space is formed by the second plate disposed at the entry of the first space and the third plate disposed at the entry of the second space. Spin-up polarized neutrons and spin-down polarized neutrons are simultaneously separated and transferred in the first and second spaces, respectively. Therefore, with minimum loss of the neutrons, the spin-up polarized neutrons and the spin-down polarized neutrons are effectively separated and collected.

12 Claims, 8 Drawing Sheets

PRIOR ART

POLARIZED NEUTRON GUIDE

RELATED APPLICATION

The present application is based on, and claims priority from, Korean Patent Application No. 2005-64213, filed Jul. 15, 2005, the disclosure of which is hereby incorporated by reference herein in its entirety.

BACKGROUND OF THE INVENTION

1. Field of the Invention

The present invention relates to a polarized neutron guide, and more particularly, to a polarized neutron guide improved in its yield, solving a problem of a low yield of 50% in the case of a general polarized neutron guide.

2. Description of the Related Art

Figure 1:
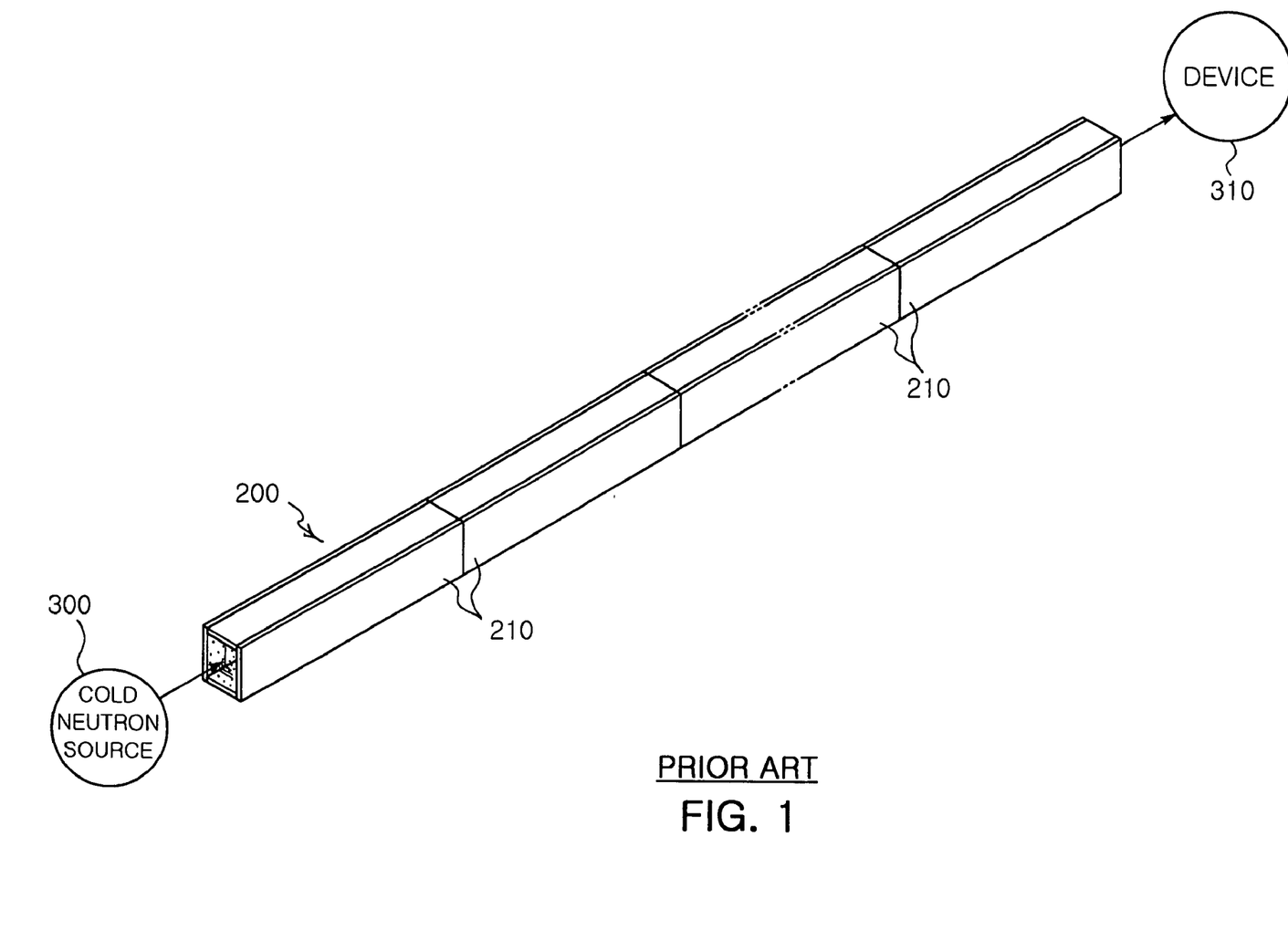
FIG. 1 is a perspective view of a neutron guide according to the related art.

A neutron guide is a hollow tube consisting of glass plates deposited with Nickel or periodic multi-layer (super mirror) for transferring cold neutrons (referred to as neutrons hereinafter) generated from a cold neutron source in a vacuum state to a device located for a long distance with a minimum loss. Referring to FIG. 1, the neutron guide 200 is formed at a desired length extended to a device by serially connecting a plurality of guide units 210.

Figure 2:
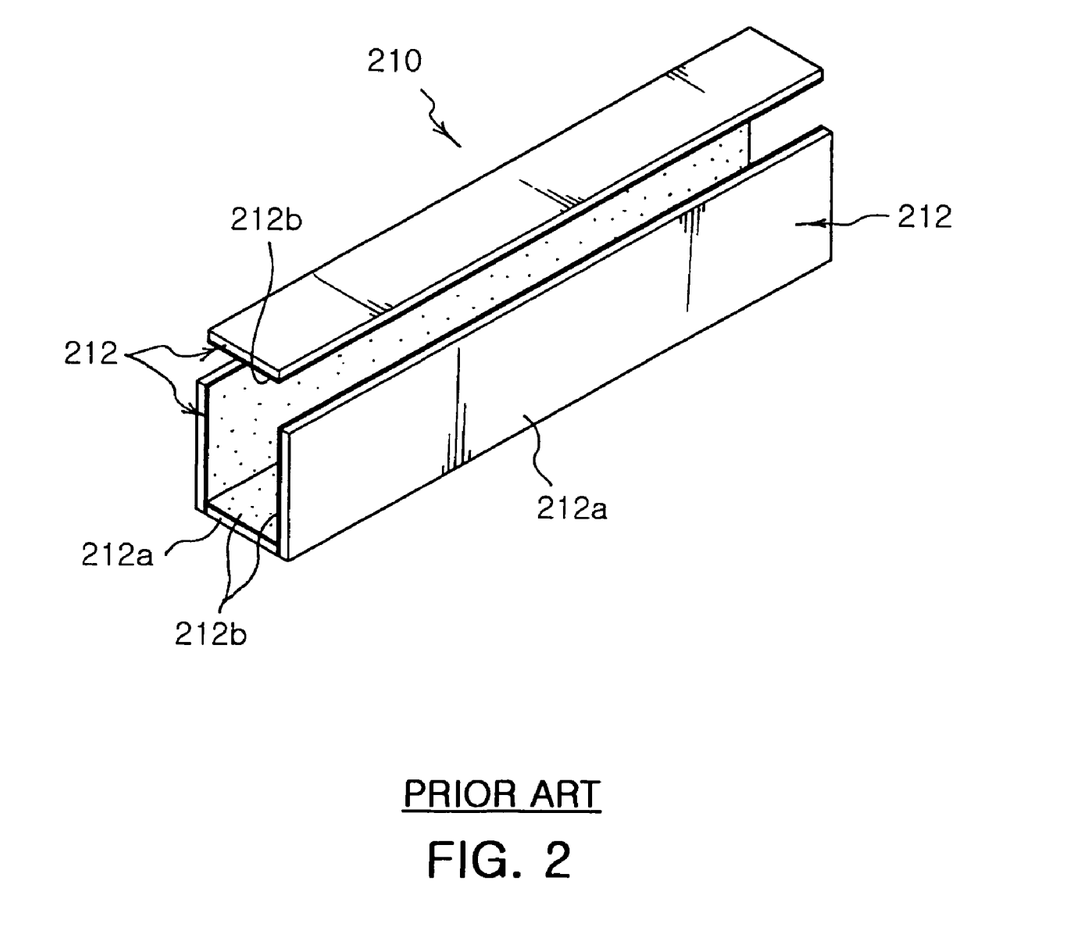
FIG. 2 is an exploded perspective view of bonding structure of super mirrors constituting a neutron guide according to the related art.

Referring to FIG. 2, the guide units 210 of the neutron guide 200 have a length of about 1 m, with the super mirrors being assembled in a long-box shape having a quadrangular cross-section.

In the super mirrors 212, which are capable of enlarging the total reflection angle by two folds or more, a magnetic material of high scattering length density (Ni, Fe, Co) and a non-magnetic material of low scattering length density (Si, Ti, Cu) are selectively deposited on each substrate 212a to form a thin film 212b as a reflective plane on a surface facing the inner path formed by the guide units 210.

Therefore, the guide units 210 allow neutrons to be total-reflected within a critical angle in the inside by the super mirrors 212 formed by thin-film deposition.

The neutrons in most of elements except some elements (e.g., Gd, Mn) have a positive (+) scattering-length density, which means that an incident angle of neutrons between an incident direction and a medium surface is greater than a refractive angle in the medium unlike electromagnetic waves in a visible light region. Such special property of neutron and an X-ray means that the neutron and the X-ray can be total-reflected from a medium when they are incident on the surface of the ideal material (medium) within a critical angle.

Therefore, a basic concept of 58Ni neutron guide capable of moving, i.e., transferring neutrons using the total-reflection property of the neutrons has been suggested in the related art. Since then, a super mirror guide has been used as a neutron guide formed with using the natural nickel and titanium (58Ni: 68%).

Neutrons, electrons, X-rays tend to be diffracted in a structure of periodically repeated crystal planes of a crystal of an atom or a molecule. Diffraction can be observed in a thin-film structure where two different materials are artificially repeated periodically.

A theory that a diffracted line width can be widened up to a critical angle by changing the thickness of repeated multi-layered thin films has been introduced. A medium capable of widening a total reflection angle of nickel more than two times by applying the above theory is a super mirror 212, which is used for a neutron guide 200.

To transfer the neutrons generated from a cold neutron source 300 up to a remotely located device 310 without loss of the neutrons, a neutron guide 200 in a vacuum state is used. As described above, the related art neutron guide 200 uses the property that neutrons are total-reflected when they are incident on the surface of a material (medium) within a critical angle.

Neutrons transferred through the neutron guide 200 may sometimes require the spin of the neutron biased in one direction. Using ferromagnetic material and non-magnetic material for the super mirror to form the multi-layer thin film, spin-up polarized neutrons can be separated from spin-down polarized neutrons. In this case, only the type of spin needed for the corresponding apparatus 310 should be used and the rest of the types should be separated to be discarded.

To polarize and supply neutrons, a polarized neutron guide is required. The polarized neutron guide can be made of alloys of ferromagnetic materials. A neutron due to its own magnetic moment, has any of two spin directions i.e. a spin-up direction parallel with the direction of a magnetic field and a spin-down direction unparallel with the direction of a magnetic field. The two spin directions of a neutron result in different scattering abilities for a magnetized material. It is possible to polarize a neutron using this property.

Figure 3:
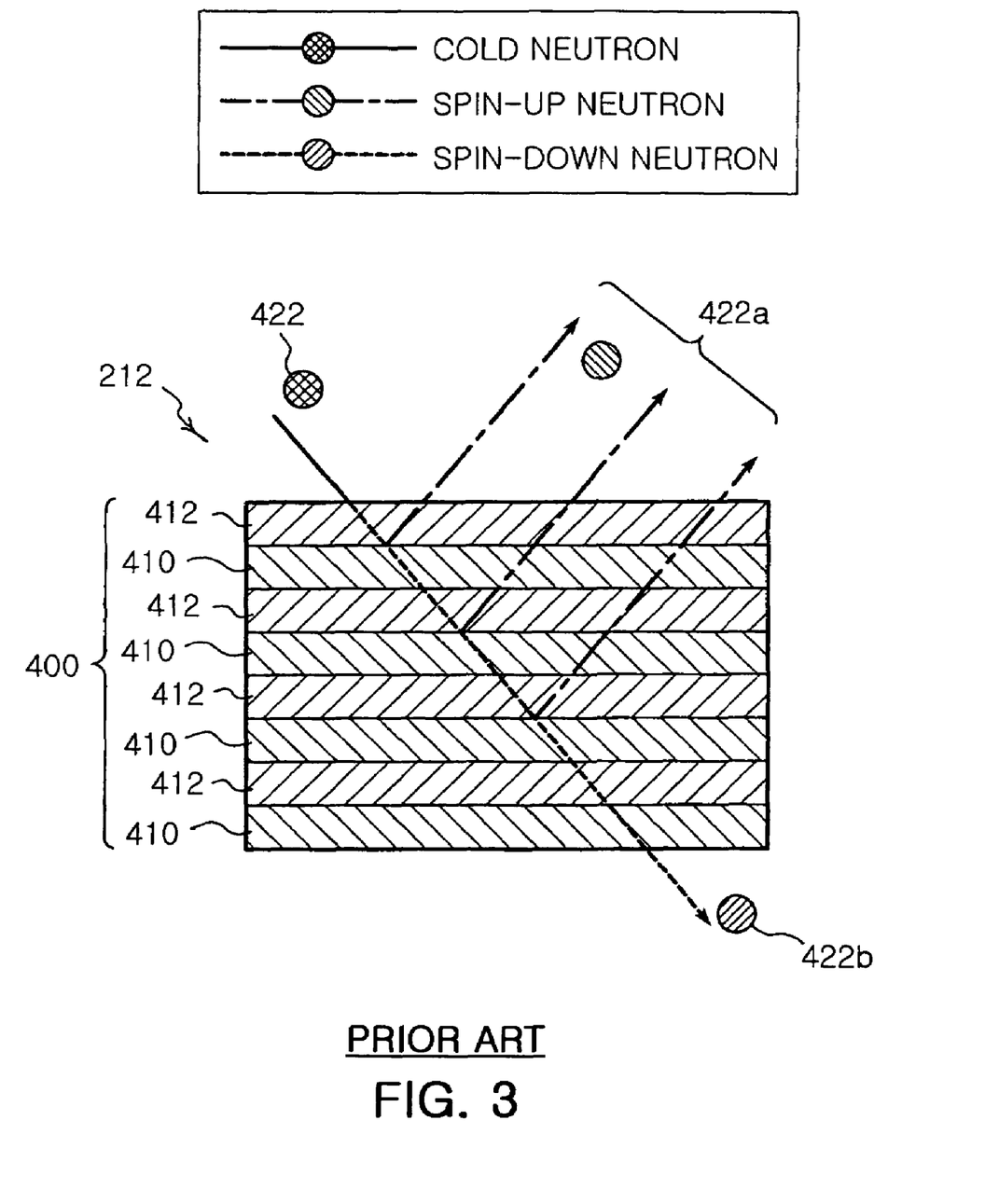
FIG. 3 is a view explaining polarizing operations of spin-up polarized neutrons and spin-down polarized neutrons performed in a polarized neutron guide according to the related art.

For the super mirror 212 of a neutron guide 200 for transferring neutrons, if the thin film 400 is composed of FeCo of the magnetic material 410 and Si of the non-magnetic material 412 at a ratio of 89:11, the down-spin neutron ultimately has the same scattering length density as that of Si, the non-magnetic material 412. Thus, when the thin film 400 is formed, the up-spin neutron 422 is diffracted or reflected whereas the down-spin neutron 422b cannot be diffracted but permeates due to the same scattering length density as that of Si, unable to distinguish between FeCo and Si, as illustrated in FIG. 3.

The polarized neutron guide may be a residual magnetic polarized guide. The residual magnetic polarized guide is formed so that a thin film 400 magnetized under a magnetic field does not lose magnetization thereof even though the magnetic field disappears afterward. The residual magnetic polarized guide is manufactured using a principle of a recording tape.

In the residual magnetic polarized guide, in order to easily perform magnetization, a thin film of FeCoV/TiZr is formed by adding foreign substance to FeCo alloy, or a thin film of FeCo/Ge is formed by using Ge instead of Si.

Figure 4:
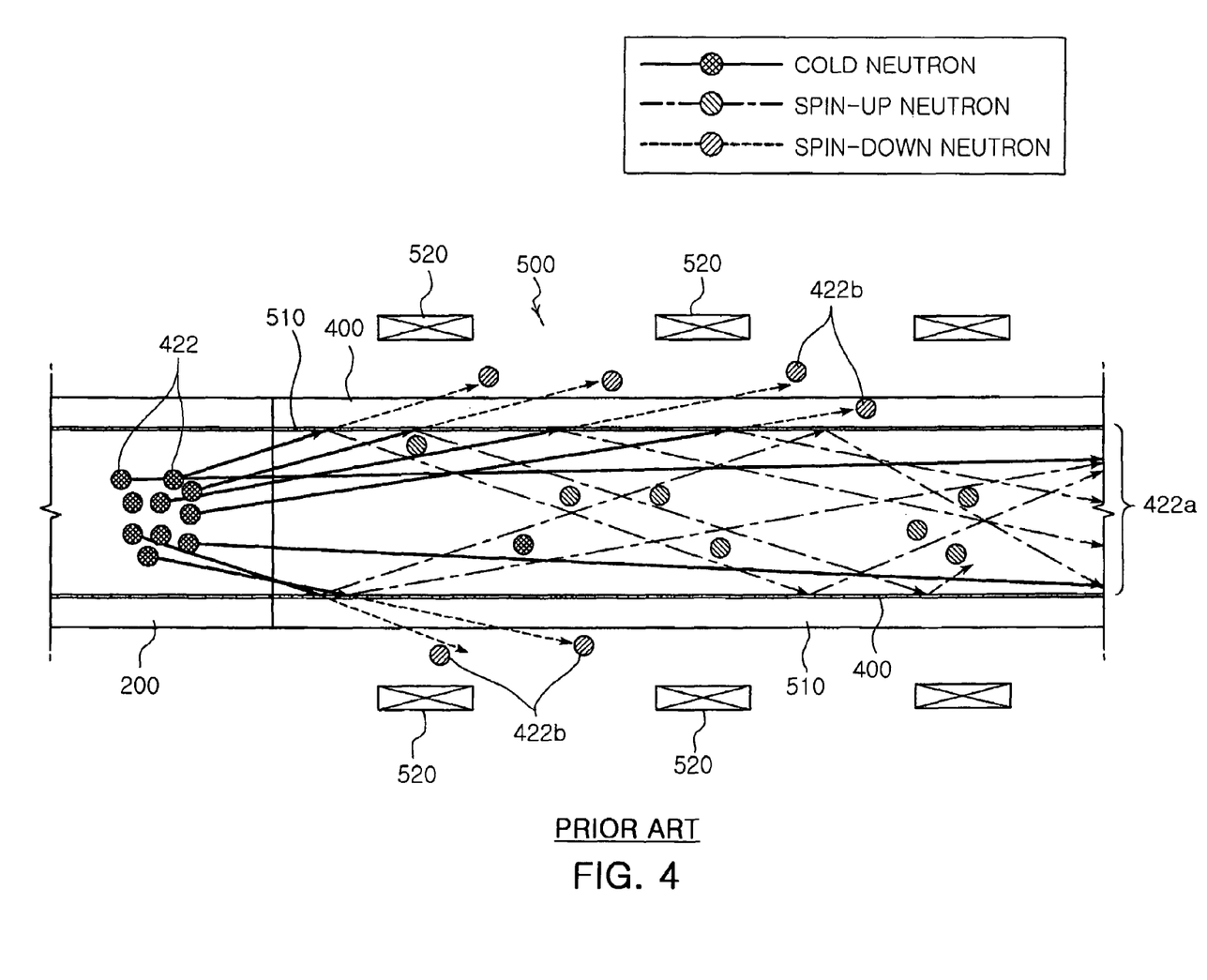
FIG. 4 is a sectional view illustrating polarizing operations where spin-up polarized neutrons are collected and spin-down polarized neutrons are removed in a polarized neutron guide according to the related art.
Figure 5:
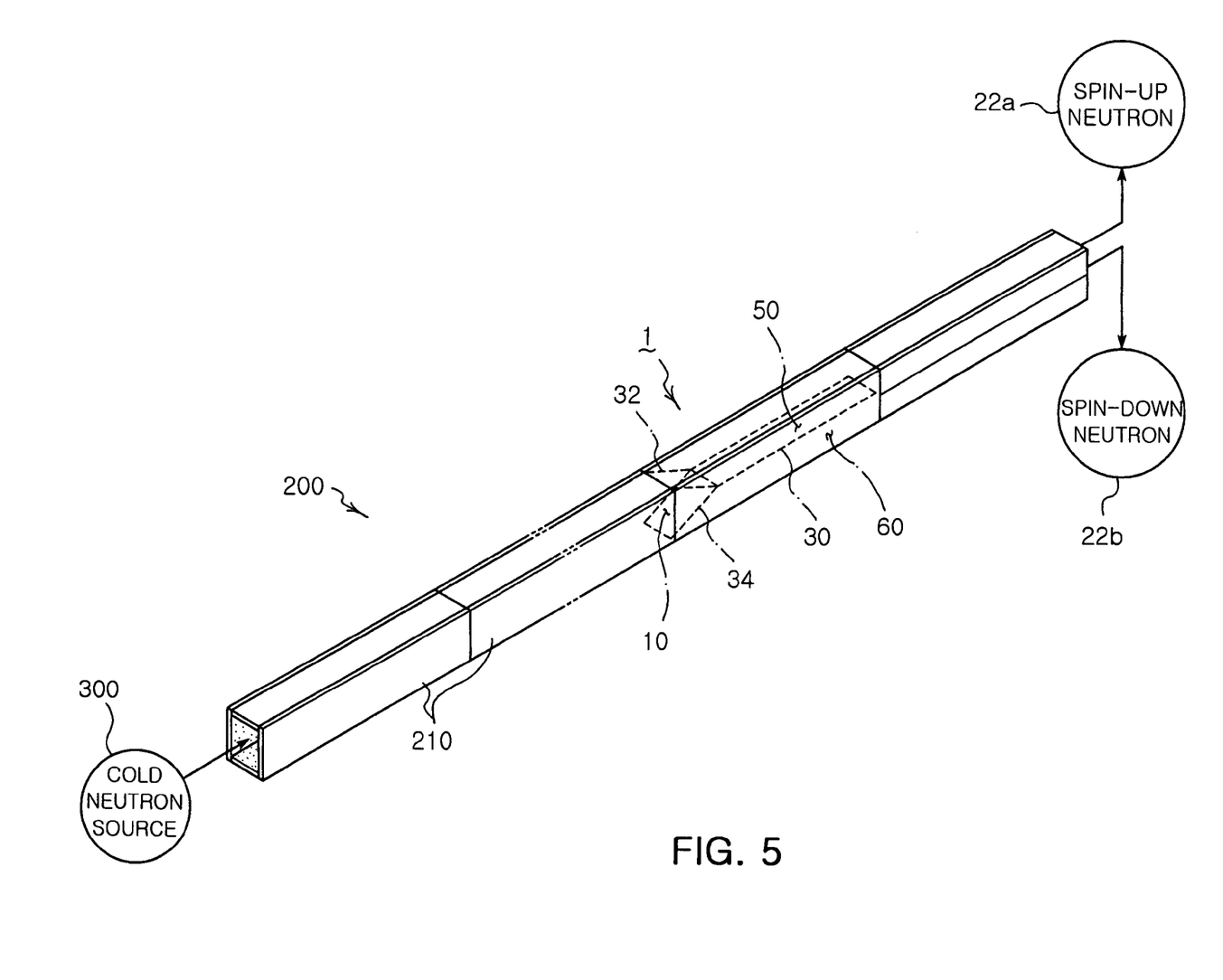
FIG. 5 is a structural view illustrating an appearance of a polarized neutron guide of the present invention that is disposed in a neutron guide.

In order to divide and selectively supply neutrons 422 transferred by the neutron guide 200 into spin-up polarized neutrons 422a or spin-down polarized neutrons 422b, a conventional polarized neutron guide 500 was suggested as illustrated in FIG. 4.

The conventional polarized neutron guide 500 for generating polarized neutrons is connected at the front with the neutron guide 200 to receive neutrons 422, and separates the neutrons 422 into spin-up polarized neutrons 422a and spin-down polarized neutrons 422b. However, the conventional polarized neutron guide 500 has a disadvantage of collecting only selected polarized neutrons (e.g., spin-up polarized neutrons 422a, which is 50% of the neutrons 422 only), and losing non-selected polarized neutrons (e.g., spin-down polarized neutrons 422b, which is 50% of the neutrons 422), during this process.

Various materials can be used for manufacturing the polarized neutron guide 500 for polarizing and separating the neutrons. For representative example, an alloy of ferromagnetic material such as Fe and Co can be used with Si. A thin film of magnetic material 410 of for example FeCo alloy deposited on the surface of a super mirror 510 in the conventional polarized neutron guide 500 is magnetized inside a magnetic field of a magnetic field generating member 520 installed outside the polarized neutron guide 500. Neutrons 422 flowing into the polarized neutron guide 500 under the magnetic field are divided into spin-up polarized neutrons 422a and spin-down polarized neutrons 422b having different scattering length densities, respectively.

That is, since the scattering length density of the spin-down polarized neutrons 422b due to the magnetic material 410 of FeCo is matched with the scattering length density of the spin-down polarized neutrons 422b of Si, which is a non-magnetic material 412, regardless of a difference between the two materials 410 and 412, the spin-down polarized neutrons 422b are all transmitted below a critical angle of the super mirror 510 constituting the polarized neutron guide 500. On the contrary, the spin-up polarized neutrons 422a are diffracted and total-reflected by the super mirror 510 constituting the polarized neutron guide 500, and transferred inside the guide 500. With such a principle, the conventional polarized neutron guide 500 can polarize the spin-up polarized neutrons 422a only from the neutrons 422 to collect the same.

However, since the conventional polarized neutron guide 500 separates one kind of polarized neutrons, i.e., the spin-up polarized neutrons 422a only without collecting the spin-down polarized neutrons 422b, the neutrons 422 are used in 50% only in viewpoint of the whole collecting efficiency.

Unlike the polarized neutron guide 500 consisting of super mirrors 510 using the above-described related art magnetic material 410 and non-magnetic material 412, i.e., FeCo/Si, a neutron inverse-polarization guide (not shown) using super mirrors of a Co/Cu has been suggested, which is designed to transmit and remove the spin-up polarized neutrons 422a, while reflecting and collecting the spin-down polarized neutrons 422b.

Therefore, conventionally, where the spin-up polarized neutrons 422a or the spin-down polarized neutrons 422b is required respectively, the polarized neutron guide 500 made of FeCo/Si for separately collecting the spin-up polarized neutrons 422a is used, or a spin-flipper for separately obtaining the spin-down polarized neutrons 422b is used. These polarized neutron guides are very expensive, and require a precise treatment but considered inefficient, since the yield of neutron is only about 50%.

SUMMARY OF THE INVENTION

Accordingly, the present invention is directed to a polarized neutron guide that substantially obviates one or more problems due to limitations and disadvantages of the related art.

An object of the present invention is to provide a polarized neutron guide capable of separating neutrons into spin-up polarized neutrons and spin-down polarized neutrons while minimizing loss of the neutrons.

Another object of the present invention is to provide a polarized neutron guide capable of effectively separating polarized neutrons, achieving size reduction, and remarkably lowering installation costs while having a simple structure, not requiring a plurality of polarized neutron guides.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a polarized neutron guide capable of separating and transferring spin-up polarized neutrons and spin-down polarized neutrons from neutrons, the polarized neutron guide comprising:

a body having a vacuum space formed therein through which neutrons are transferred, and including super mirrors disposed on a plane facing the vacuum space and coated with a neutron-reflective thin film;

first and second spaces formed inside the body by the vacuum space partitioned by a first plate whose surfaces are coated with neutron-reflective thin films; and a neutron separation space formed by a second plate disposed at an entry of the first space, sloped to a front edge side of the first plate from an inner plane on one side of the body, and a third plate disposed at an entry of the second space, sloped to a front edge side of the first plate from an inner plane on other side of the body, whereby spin-up polarized neutrons and spin-down polarized neutrons are simultaneously separated and transferred to the first and second spaces, respectively.

According to an aspect of the present invention, there is provided a polarized neutron guide capable of separating and transferring spin-up polarized neutrons and spin-down polarized neutrons from neutrons, the polarized neutron guide comprising:

a body having a vacuum space formed therein through which neutrons are transferred and including super mirrors disposed on a plane facing the vacuum space and coated with a neutron-reflective thin film;

a first plate mounted inside the body to partition the vacuum space into first and second spaces, and having surfaces coated with neutron-reflective thin films;

a second plate disposed at an entry of the first space, sloped to a front edge side of the first plate from an inner plane on one side of the body, and having a surface coated with a thin film for transmitting spin-up polarized neutrons; and a third plate disposed at an entry of the second space, sloped to a front edge side of the first plate from an inner plane on other side of the body, and having a surface coated with a thin film for transmitting spin-down polarized neutrons, whereby spin-up polarized neutrons and spin-down polarized neutrons are simultaneously separated and transferred to the first and second spaces, respectively.

A portion of the body enclosing the first and second spaces and the first plate may be coated with Ni/Ti in the form of a thin film, so that spin-up polarized neutrons or spin-down polarized neutrons are transferred therein.

A portion of the body enclosing the first space and the first plate may be coated with FeCo/Si or Ni/Ti in the form of a thin film so that spin-up polarized neutrons are transferred therein, and a portion of the body enclosing the second space and the first plate may be coated with Co/Cu or Ni/Ti in the form of a thin film so that spin-down polarized neutrons are transferred therein.

A portion of the body enclosing the first space and the first plate may be coated with Co/Cu or Ni/Ti in the form of a thin film so that spin-down polarized neutrons are transferred therein, and a portion of the body enclosing the second space and the first plate may be coated with FeCo/Si or Ni/Ti in the form of a thin film so that spin-up polarized neutrons are transferred therein.

For the first space to transfer spin-up polarized neutrons, the second plate mounted at the entry of the first space may include polarizing-neutron super mirrors for transmitting spin-up polarized neutrons and reflecting spin-down polarized neutrons to the third plate of the second space. For the second space to transfer spin-down polarized neutrons, the third plate mounted at the entry of the second space may include polarizing-neutron super mirrors for transmitting spin-down polarized neutrons and reflecting spin-up polarized neutrons to the second plate of the first space.

For the first space to transfer spin-down polarized neutrons, the second plate mounted at the entry of the first space may include polarizing-neutron super mirrors for transmitting spin-down polarized neutrons and reflecting spin-up polarized neutrons to the third plate of the second space. For the second space to transfer spin-up polarized neutrons, the third plate mounted at the entry of the second space may include polarizing-neutron super mirrors for transmitting spin-up polarized neutrons and reflecting spin-down polarized neutrons to the second plate of the first space.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

A polarized neutron guide 1 of the present invention separates spin-up polarized neutrons 22a and spin-down polarized neutrons 22b from neutrons 22 and collects the separated polarized neutrons 22a and 22b, respectively, without loss.

The polarized neutron guide 1 has a body 12 consisting of super mirrors 13 so as to transfer polarized neutrons. The super mirrors 13 may include neutron super mirrors of Co/Cu or Ni/Ti for reflecting spin-down polarized neutrons 22b, or neutron super mirrors of FeCo/Si or Ni/Ti for reflecting spin-up polarized neutrons 22a. The polarized neutron guide can maximally obtain the polarized neutrons without loss, by using combination of these super mirrors.

Figure 6:
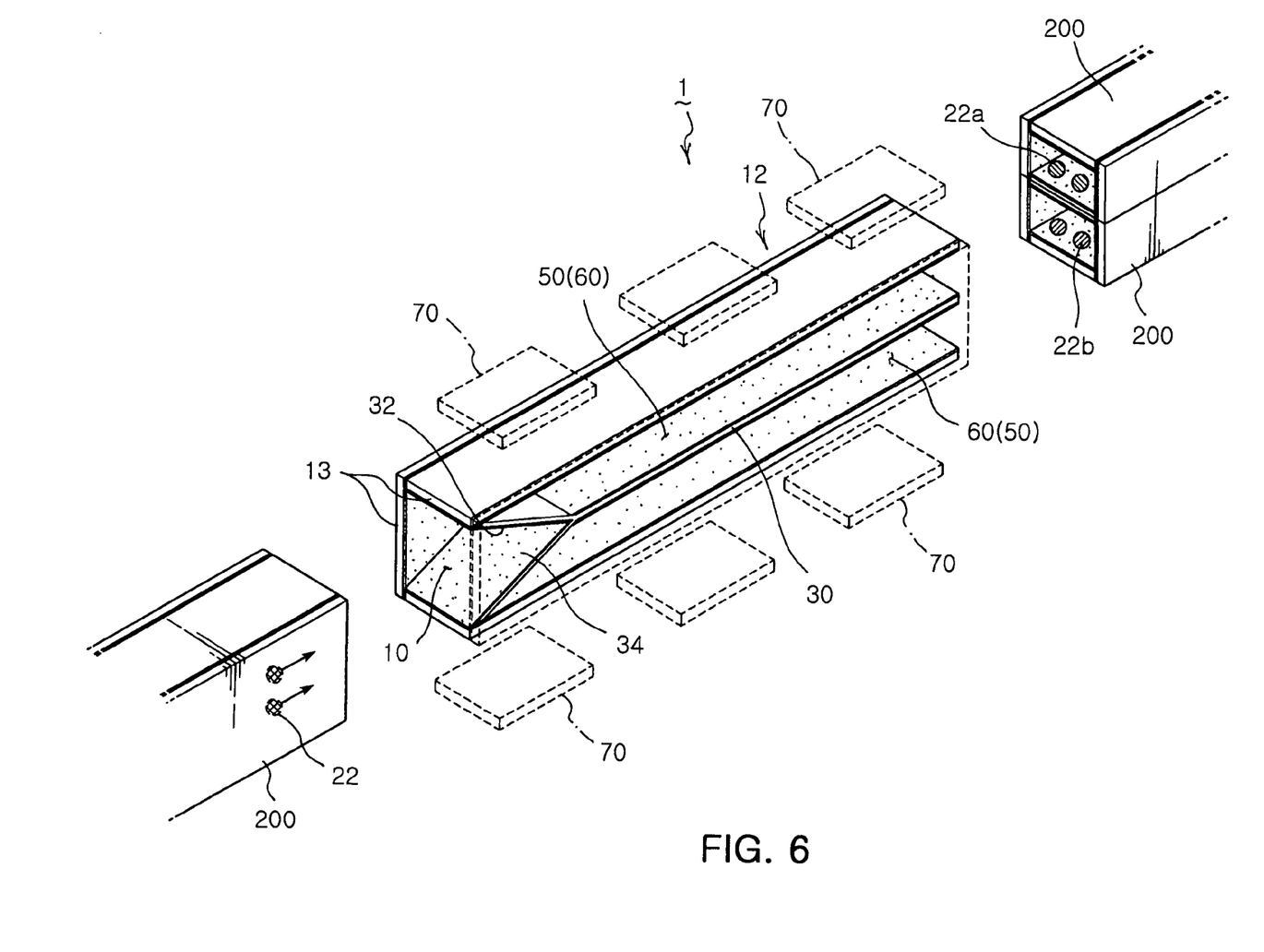
FIG. 6 is a view explaining an inner structure of a polarized neutron guide according to the present invention.

Referring to FIG. 6, the inventive polarized neutron guide 1 has a neutron separation space 10 formed at a front side and has the first and second spaces 50 and 60, which are transfer paths of spin-up and spin-down polarized neutrons 22a and 22b, respectively, formed at a front side thereof, so as to make maximum acquisition of polarized neutrons 22a and 22b.

To partition a space in the body 12 into the neutron separation space 10 and the first and second spaces 50 and 60, the first plate 30 made of a non-polarized neutron super mirror, the second plate 32 and the third plate 34 made of polarized neutron super mirrors are disposed inside the body 12.

That is, the inventive polarized neutron guide 1 has a vacuum space formed therein, through which neutrons are transferred, and has the body 12 consisting of the super mirrors 13 having a surface facing the vacuum space and coated with a neutron-reflective thin film.

The body 12 can be coated with Ni/Ti constituting non-polarized super mirrors 13 in the form of a thin film to transfer spin-up polarized neutrons 22a and/or spin-down polarized neutrons 22b.

Also, the body 12 can be coated with FeCo/Si so that spin-up polarized neutrons 22a may be transferred therein or can be coated with Co/Cu so that spin-down polarized neutrons 22b may be transferred therein.

The inventive polarized neutron guide 1 has the first space 50 and the second space 60 partitioned by the first plate 30. The first plate 30 is mounted inside the body 12 and has a surface coated with a neutron-reflective thin film.

The first and second spaces 50 and 60 form passages through which spin-up polarized neutrons 22a or spin-down polarized neutrons 22b are separated and transferred. Referring to FIG. 6, the inner space of the body 12 is divided by the first plate 30.

The first plate 30 has a plate-shaped structure and has both edges fixed inside the body 12 to form the first and second spaces 50 and 60 at the upper portion and the lower portion, respectively. Also, the surface of the first plate 30 is coated with Ni/Ti in the form of a thin film so that spin-up polarized neutrons 22a and/or spin-down polarized neutrons 22b may be transferred.

Also, the first plate 30 is coated with FeCo/Si so that spin-up polarized neutrons 22a may be transferred or coated with Co/Cu so that spin-down polarized neutrons 22b may be transferred. Also, the first plate 30 may have one side coated with FeCo/Si and the other side coated with Co/Cu.

Also, though the first plate 30 is illustrated to divide the inner side space of the body 12 vertically in FIG. 6, the present invention is not limited to this but the first plate 30 can be vertically arranged inside the body 12 to horizontally divide the inner space. The present invention is not limited to this arrangement but includes all of the above arrangements.

The inventive guide 1 has a neutron separation space 10 formed at the front side of the first and second spaces 50 and 60. The neutron separation space 10 is formed by the second plate 32 disposed at the entry of the first space 50, sloped to the front edge side of the first plate 30 from an inner plane on one side of the body 12, and the third plate 34 disposed at the entry of the second space 60, sloped to the front edge side of the first plate 30 from an inner plane on other side of the body 12.

Therefore, the neutrons 22 flowing into the polarized neutron guide 1 are separated into spin-up polarized neutrons 22a and spin-down polarized neutrons 22b at the neutron separation space 10, and the spin-up polarized neutrons 22a and the spin-down polarized neutrons 22b are transferred through the first and second spaces 50 and 60, respectively, at the rear side.

A magnetic field applying member 70 for applying a magnetic field on the neutrons 22 to primarily align the neutrons 22 in parallel or in anti-parallel with the magnetic field is disposed at the outer side of the polarized neutron guide 1.

The neutrons 22 are separated into the spin-up polarized neutrons 22a and the spin-down polarized neutrons 22b at the neutron separation space 10 by the magnetic field applying member 70. The polarized neutrons 22a and 22b are transmitted or reflected to the first and second spaces 50 and 60 by the second and third plates 32 and 34, which are super mirrors mounted on a slope.

The second plate 32 is disposed at the entry of the first space 50, sloped to the front edge side of the first plate 30 from an inner plane on one side of the body 12, and has a surface coated with a thin film (e.g., Co/Cu) that transmits the spin-up polarized neutrons 22a.

The third plate 34 is disposed at the entry of the second space 60, sloped to the front edge side of the first plate 30 from an inner plane on other side of the body 12, and has a surface coated with a thin film (e.g., FeCo/Si) that transmits the spin-down polarized neutrons 22b.

The neutrons 22 are separated by the neutrons separation space 10 formed by the second and third plates 32 and 34 within the body 12 to flow into the first and second spaces 50 and 60. The separated neutrons are constantly reflected inside the first and second spaces 50 and 60 and transferred up to a device that requires the polarized neutrons 22a and 22b respectively.

Figure 7:
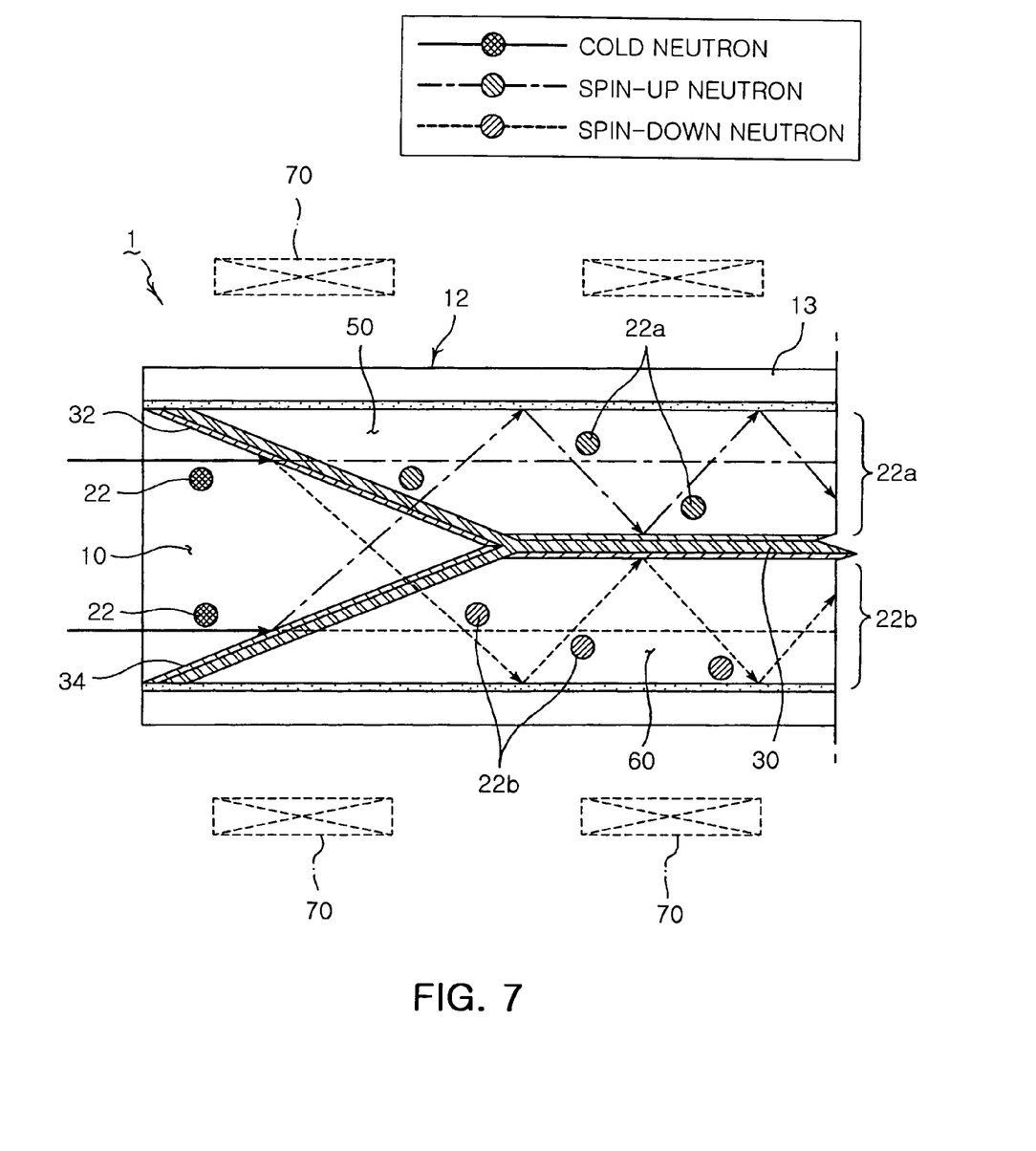
FIGS. 7 and 8 are views illustrating operations where spin-up polarized neutrons and spin-down polarized neutrons are separated and collected in a polarized neutron guide of the present invention.

For that purpose, a body 12 enclosing the first and second spaces 50 and 60 and the first plate 30 are coated with a thin film of Ni/Ti as illustrated in FIG. 7, so that spin-up polarized neutrons 22a and/or spin-down polarized neutrons 22b may be transferred.

Also, referring to FIG. 7, a body 12 enclosing the first space 50 and the first plate 30 are coated with a thin film of FeCo/Si or Ni/Ti so that spin-up polarized neutrons 22a may be transferred, and a body 12 enclosing the second space 60 and the first plate 30 are coated with a thin film of Co/Cu or Ni/Ti so that spin-down polarized neutrons 22b may be transferred.

Figure 8:
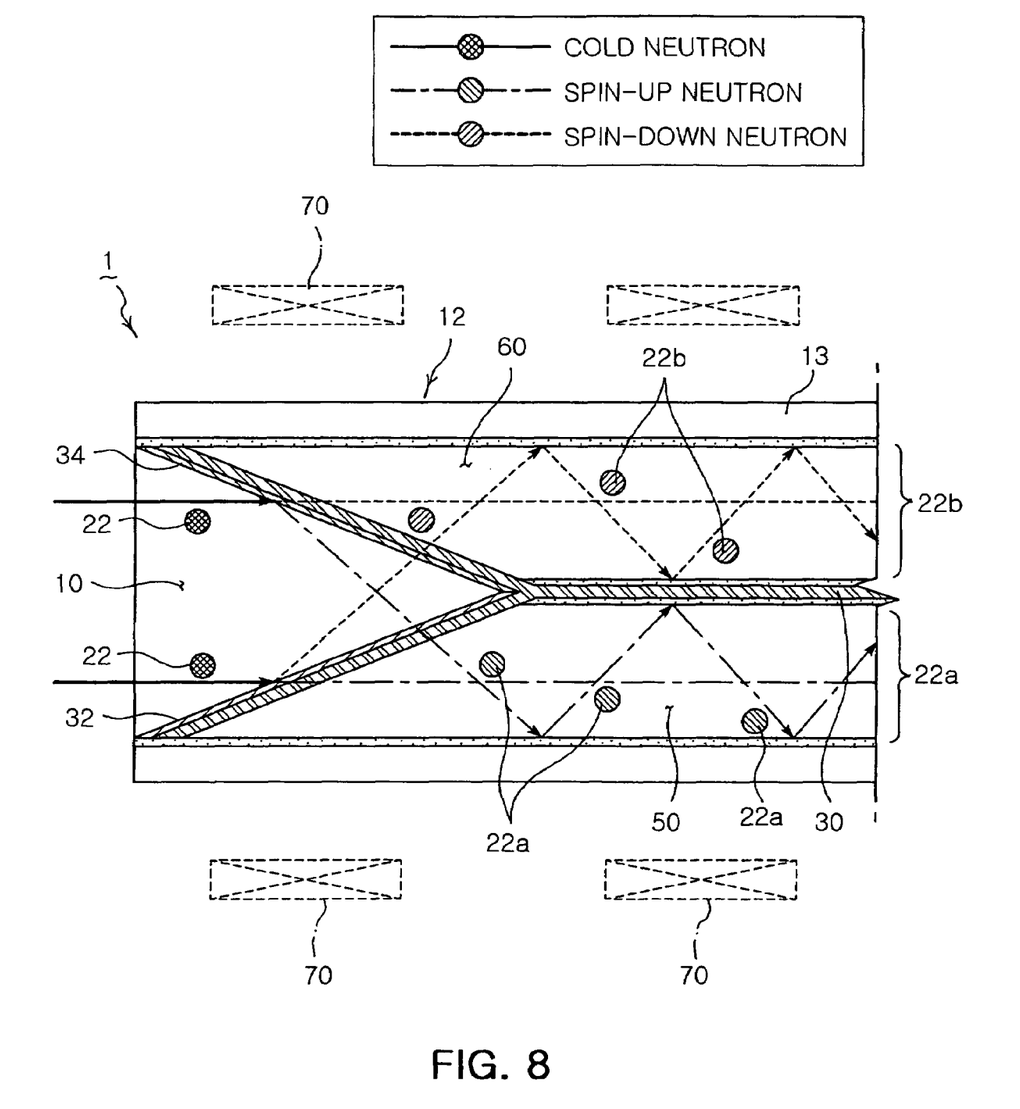

Referring to FIG. 8, unlike the above-described construction, a body 12 enclosing the first space 50 and the first plate 30 may be coated with Co/Cu or Ni/Ti in the form of a thin film so that spin-down polarized neutrons 22b are transferred, and a body 12 enclosing the second space 60 and the first plate 30 may be coated with FeCo/Si or Ni/Ti in the form of a thin film so that spin-up polarized neutrons 22a are transferred.

For the first space 50 to transfer spin-up polarized neutrons 22a, the second plate 32 mounted at the entry of the first space 50 comprises polarizing-neutron super mirrors for transmitting spin-up polarized neutrons 22a and reflecting spin-down polarized neutrons 22b to the third plate 34 of the second space 60. Therefore, the second plate 32 has a thin film of Co/Cu deposited thereon.

Also, for the second space 60 to transfer spin-down polarized neutrons 22b, the third plate 34 mounted at the entry of the second space 60 comprises polarizing-neutron super mirrors for transmitting spin-down polarized neutrons 22b and reflecting spin-up polarized neutrons 22a to the second plate 32 of the first space 50. Therefore, the third plate 34 has a thin film of FeCo/Si deposited thereon.

According to the present invention, the positions of the second plate 32 and the third plate 34, and the positions of the first space 50 and the second space 60 can be changed vertically or horizontally.

According to the inventive neutron guide 1 having the above construction, when the neutrons 22 flow into the neutron separation space 10 formed at the front side of the body 12 from a general neutron guide 200, a magnetic field is applied to the neutrons 22 by the magnetic field applying member 70.

After the neutrons 22 are primarily aligned in parallel or anti-parallel with the magnetic field by the magnetic field in the neutron separation space 10, the neutrons 22 are separated into the spin-up polarized neutrons 22a and the spin-down polarized neutrons 22b by the two kinds of polarized neutron mirrors, i.e., the second plate 32 and the third plate 34.

Since the second plate 32 and the third plate 34 are disposed on a slope facing each other, and deposited with a thin film of Co/Cu or FeCo/Si, the second plate 32 thin-film deposited with Co/Cu transmits the spin-up polarized neutrons 22a and total-reflects the spin-down polarized neutrons 22b to the third plate 34 of the second space 60.

Also, the third plate 34 thin-film deposited with FeCo/Si transmits the spin-down polarized neutrons 22b and total-reflects the spin-up polarized neutrons 22a to the second plate 32 of the first space 50.

Therefore, only the spin-up polarized neutrons 22a that have passed through the second plate 32 and the spin-up polarized neutrons 22a that have been reflected from the third plate 34 and passed through the second plate 32 exist in the first space 50. The above spin-up polarized neutrons 22a are transferred forward through the first space 50 enclosed by the thin-film layers of Ni/Ti or FeCo/Si of the body 12 and the first plate 30.

Also, only the spin-down polarized neutrons 22b that have passed through the third plate 32 and the spin-down polarized neutrons 22b that have been reflected from the second plate 32 and passed through the third plate 34 exist in the second space 60. The above spin-down polarized neutrons 22b are total-reflected to be transferred through the second space 60 enclosed by the thin-film layers of Ni/Ti or Co/Cu of the body 12 and the first plate 30.

As described above, the neutrons 22 that have been separated into the spin-up polarized neutrons 22a and the spin-down polarized neutrons 22b are constantly total-reflected and transferred to a desired device through the first and second spaces 50 and 60 within the body 12 consisting of combination of the general non-polarized neutron super mirrors of a Ni/Ti type or the polarized neutron super mirrors of a FeCo/Si type and a Co/Cu type.

The first and second spaces 50 and 60 transfer the separated spin-up polarized neutrons 22a and spin-down polarized neutrons 22b through the general neutron guide 200 connected at the rear side of the body 12.

Therefore, according to the present invention, since both the spin-up polarized neutrons 22a and the spin-down polarized neutrons 22b are separated and collected, loss of the polarized neutrons can be minimized. Also, though the first and second spaces 50 and 60 for transferring the spin-up polarized neutrons 22a and the spin-down polarized neutrons 22b are vertically partitioned inside the body 12, the present invention is not limited to this structure but the first and second spaces 50 and 60 can be horizontally disposed.

According to the present invention, the neutrons can be separated into the spin-up polarized neutrons and the spin-down polarized neutrons and collected, so that loss of the neutrons is minimized and the polarized neutrons can be effectively obtained.

The present invention can effectively separate the polarized neutrons in a simple structure without a plurality of polarized neutron guides, thereby achieving an equipment of a small-sized structure and remarkably lowering installation costs of a polarized-neutron separating and collecting device.

Also, loss of the spin-up polarized neutrons or the spin-down polarized neutrons is minimized, so that a polarized neutron preparation time at a device where the neutrons are to be used, is reduced and thus process efficiency improves.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A polarized neutron guide capable of separating and transferring spin-up polarized neutrons and spin-down polarized neutrons from neutrons, the polarized neutron guide comprising:
   a body having a vacuum space formed therein through which neutrons are transferred, and including super mirrors disposed on a plane facing the vacuum space and coated with a neutron-reflective thin film;
   first and second spaces formed inside the body by the vacuum space partitioned by a first plate whose surfaces are coated with neutron-reflective thin films; and
   a neutron separation space formed by a second plate disposed at an entry of the first space, sloped to a front edge side of the first plate from an inner plane on one side of the body, and a third plate disposed at an entry of the second space, sloped to a front edge side of the first plate from an inner plane on the other side of the body,
   whereby spin-up polarized neutrons and spin-down polarized neutrons are simultaneously separated and transferred to the first and second spaces, respectively.

2. The polarized neutron guide of claim 1, wherein a portion of the body enclosing the first and second spaces and the first plate are coated with Ni/Ti in the form of a thin film, so that spin-up polarized neutrons or spin-down polarized neutrons are transferred therein.

3. The polarized neutron guide of claim 1, wherein a portion of the body enclosing the first space and the first plate are coated with FeCo/Si or Ni/Ti in the form of a thin film so that spin-up polarized neutrons are transferred therein, and a portion of the body enclosing the second space and the first plate are coated with Co/Cu or Ni/Ti in the form of a thin film so that spin-down polarized neutrons are transferred therein.

4. The polarized neutron guide of claim 1, wherein a portion of the body enclosing the first space and the first plate are coated with Co/Cu or Ni/Ti in the form of a thin film so that spin-down polarized neutrons are transferred therein, and a portion of the body enclosing the second space and the first plate are coated with FeCo/Si or Ni/Ti in the form of a thin film so that spin-up polarized neutrons are transferred therein.

5. The polarized neutron guide of claim 1, wherein for the first space to transfer spin-up polarized neutrons, the second plate mounted at the entry of the first space comprises polarizing-neutron super mirrors for transmitting spin-up polarized neutrons and reflecting spin-down polarized neutrons to the third plate of the second space, and for the second space to transfer spin-down polarized neutrons, the third plate mounted at the entry of the second space comprises polarizing-neutron super mirrors for transmitting spin-down polarized neutrons and reflecting spin-up polarized neutrons to the second plate of the first space.

6. The polarized neutron guide of claim 1, wherein for the first space to transfer spin-down polarized neutrons, the second plate mounted at the entry of the first space comprises polarizing-neutron super mirrors for transmitting spin-down polarized neutrons and reflecting spin-up polarized neutrons to the third plate of the second space, and for the second space to transfer spin-up polarized neutrons, the third plate mounted at the entry of the second space comprises polarizing-neutron super mirrors for transmitting spin-up polarized neutrons and reflecting spin-down polarized neutrons to the second plate of the first space.

7. A polarized neutron guide capable of separating and transferring spin-up polarized neutrons and spin-down polarized neutrons from neutrons, the polarized neutron guide comprising:
   a body having a vacuum space formed therein through which neutrons are transferred and including super mirrors disposed on a plane facing the vacuum space and coated with a neutron-reflective thin film;
   a first plate mounted inside the body to partition the vacuum space into first and second spaces, and having surfaces coated with neutron-reflective thin films;
   a second plate disposed at an entry of the first space, sloped to a front edge side of the first plate from an inner plane on one side of the body, and having a surface coated with a thin film for transmitting spin-up polarized neutrons; and
   a third plate disposed at an entry of the second space, sloped to a front edge side of the first plate from an inner plane on other side of the body, and having a surface coated with a thin film for transmitting spin-down polarized neutrons,
   whereby spin-up polarized neutrons and spin-down polarized neutrons are simultaneously separated and transferred to the first and second spaces, respectively.

8. The polarized neutron guide of claim 7, wherein a portion of the body enclosing the first and second spaces and the first plate are coated with Ni/Ti in the form of a thin film, so that spin-up polarized neutrons or spin-down polarized neutrons are transferred therein.

9. The polarized neutron guide of claim 7, wherein a portion of the body enclosing the first space and the first plate are coated with FeCo/Si or Ni/Ti in the form of a thin film so that spin-up polarized neutrons are transferred therein, and a portion of the body enclosing the second space and the first plate are coated with Co/Cu or Ni/Ti in the form of a thin film so that spin-down polarized neutrons are transferred therein.

10. The polarized neutron guide of claim 7, wherein a portion of the body enclosing the first space and the first plate are coated with Co/Cu or Ni/Ti in the form of a thin film so that spin-down polarized neutrons are transferred therein, and a portion of the body enclosing the second space and the first plate are coated with FeCo/Si or Ni/Ti in the form of a thin film so that spin-up polarized neutrons are transferred therein.

11. The polarized neutron guide of claim 7, wherein for the first space to transfer spin-up polarized neutrons, the second plate mounted at the entry of the first space comprises polarizing-neutron super mirrors for transmitting spin-up polarized neutrons and reflecting spin-down polarized neutrons to the third plate of the second space, and for the second space to transfer spin-down polarized neutrons, the third plate mounted at the entry of the second space comprises polarizing-neutron super mirrors for transmitting spin-down polarized neutrons and reflecting spin-up polarized neutrons to the second plate of the first space.

12. The polarized neutron guide of claim 7, wherein for the first space to transfer spin-down polarized neutrons, the second plate mounted at the entry of the first space comprises polarizing-neutron super mirrors for transmitting spin-down polarized neutrons and reflecting spin-up polarized neutrons to the third plate of the second space, and for the second space to transfer spin-up polarized neutrons, the third plate mounted at the entry of the second space comprises polarizing-neutron super mirrors for transmitting spin-up polarized neutrons and reflecting spin-down polarized neutrons to the second plate of the first space.

* * * * *